Aug. 5, 1924.
E. CONLEY
1,503,485
AUTOMOBILE RADIATOR SHIELD
Filed Feb. 4, 1922
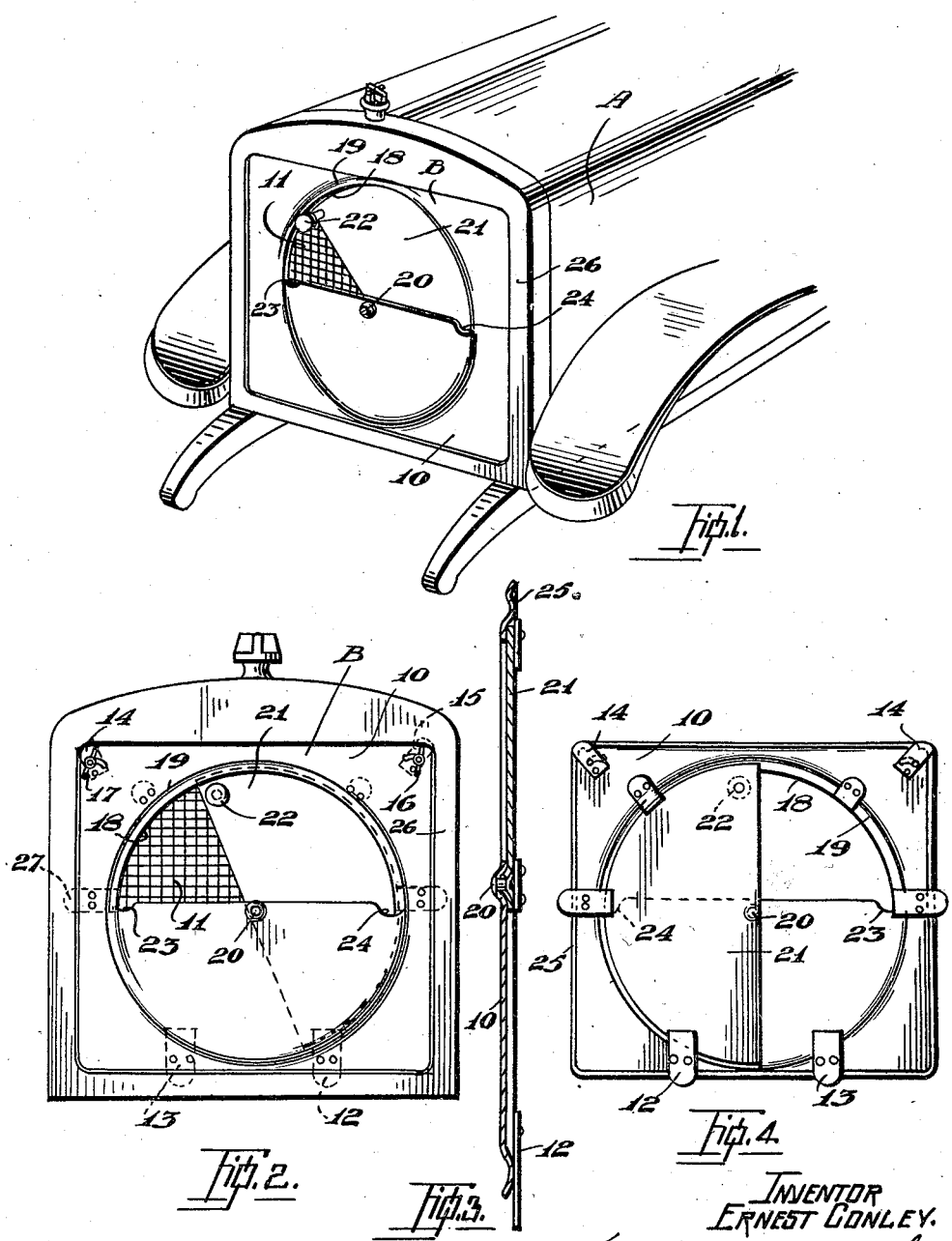
INVENTOR
ERNEST CONLEY.

Patented Aug. 5, 1924.

1,503,485

UNITED STATES PATENT OFFICE.

ERNEST CONLEY, OF SHERBROOKE, QUEBEC, CANADA.

AUTOMOBILE RADIATOR SHIELD.

Application filed February 4, 1922. Serial No. 534,206.

*To all whom it may concern:*

Be it known that I, ERNEST CONLEY, a subject of the King of Great Britain, and resident of the city of Sherbrooke, in the Province of Quebec, Dominion of Canada, have invented certain new and useful Improvements in Automobile Radiator Shields, of which the following is a specification.

This invention relates to automobile radiator shields, and has for its object to provide a suitable shield designed to be located on the head of the radiator of an automobile.

Further objects are to provide a means of retaining the heat within the engine case, and thus cause the engine to work with more efficiency in vaporizing the fuel, to provide a means of preserving the parts of the radiator from danger of frost by retaining within the engine case the heat evolved by the working of the operation of the engine.

Further objects are to provide a shield, which consists essentially of a plate provided with a semi-circular opening designed to be closed by a semi-circular closing element pivoted at the centre of the plate.

Further objects are to provide a radiator shield which is simple in construction, not liable to go out of repair and generally to adapt the several parts to better perform the functions required of them.

With the above and other objects in view, the invention consists essentially of the improved construction, hereinafter described in detail in the accompanying specification and drawings.

In the drawings;—

Figure 1 is a perspective view of the forward part of an automobile equipped with the improved radiator shield.

Figure 2 is a front elevation of an automobile radiator equipped with the improved shield.

Figure 3 is a vertical section through the improved radiator shield.

Figure 4 is a rear elevation of the shield.

Like characters of reference indicate corresponding parts in all the figures.

Referring to the drawings, A represents the forward part of an automobile of usual construction, the head of which is provided with improved shield B, comprising a plate 10 substantially rectangular in shape, and designed to cover the mesh work 11 of the radiator shield.

The plate is designed to be held in position by means of the two lower clamps 12 and 13, which are riveted to the plate or otherwise fastened thereto, and by means of the two upper clamps 14 and 15, mounted on screw threaded pins extending through holes in the plate 10, and engaged by winged nuts 16 and 17.

The plate 10 is formed with a semi-circular opening 18 and the peripheral edge of the opening 18 is offset as shown at 19. Pivotally mounted at the centre of the plate 10 as at 20 is a closing element 21 semi-circular in shape and designed to close the opening 18 formed in the plate.

The pivoted closing element 21 is provided near one of its ends with a knob 22 through which the said element may be suitably operated.

The lower portion of the plate 10 forming the lower edge of the opening 18 is provided with two recesses 23 and 24, which are designed to allow room for the knob 22 in the two positions of the closing element 21, namely opened and closed.

The plate 10 is designed to have an offset edge 25 adapted to be inserted between the mesh work 11 of the radiator and the outer rim thereof or water chamber 26.

The plate may be secured to the radiator head by means of additional clamps 27 secured on the sides of the plate, and suitable metal plates offset and riveted to the larger plate 10 may be provided adjacent the opposite peripheral edge of the opening 18 for the purpose of engaging the lower edge of the closing element 21 in order to retain the latter from any lateral movement.

As many changes could be made in the above construction, and many apparently widely different embodiments of my invention, within the scope of the claim constructed without departing from the spirit or scope thereof, it is intended that all matter contained in the accompanying specification and drawings shall be interpreted as illustrative and not in a limiting sense.

What I claim as my invention is:

An automobile radiator shield comprising a substantially rectangular plate formed with peripheral offset edges engaging the radiator head, a circular bulge projecting from the centre of the plate and formed with a semi-circular opening, a semi-circular closing element mounted in the circular projection to close the opening, an operating knob on the closing element, and notches in the plate to house the knob.

In witness whereof I have hereunto set my hand in the presence of two witnesses.

ERNEST CONLEY.

Witnesses:
GORDON SCOTT,
EVERETT E. CONLEY.